United States Patent
Michalske et al.

(10) Patent No.: US 9,291,113 B2
(45) Date of Patent: Mar. 22, 2016

(54) METHOD FOR OPERATING AN INTERNAL COMBUSTION ENGINE

(75) Inventors: Andreas Michalske, Kornwestheim (DE); Thomas Kirstaetter, Kirchberg an der Murr (DE)

(73) Assignee: ROBERT BOSCH GMBH, Stuttgart (DE)

(*) Notice: Subject to any disclaimer, the term of this patent is extended or adjusted under 35 U.S.C. 154(b) by 743 days.

(21) Appl. No.: 13/503,904

(22) PCT Filed: Nov. 15, 2010

(86) PCT No.: PCT/EP2010/067477
§ 371 (c)(1),
(2), (4) Date: Jul. 9, 2012

(87) PCT Pub. No.: WO2011/067097
PCT Pub. Date: Jun. 9, 2011

(65) Prior Publication Data
US 2012/0271532 A1    Oct. 25, 2012

(30) Foreign Application Priority Data

Dec. 2, 2009   (DE) .......................... 10 2009 047 400

(51) Int. Cl.
*B60T 7/12*    (2006.01)
*G05D 1/00*    (2006.01)
(Continued)

(52) U.S. Cl.
CPC ........ *F02D 41/0077* (2013.01); *F02D 41/0065* (2013.01); *F02D 41/0072* (2013.01); *F02D 41/18* (2013.01); *F02D 41/222* (2013.01); *Y02T 10/47* (2013.01)

(58) Field of Classification Search
CPC .... Y02T 10/47; F02M 25/0707; F02D 41/18; F02D 41/0072

USPC ............. 63/324, 602, 605.2; 73/117.3, 118.1, 73/118.2; 123/568.12, 568.16, 568.21, 123/672; 701/102, 103, 104, 105, 106, 107, 701/108, 114

See application file for complete search history.

(56) References Cited

U.S. PATENT DOCUMENTS 5,205,260 A * 4/1993 Takahashi ........... F02D 41/0072
                                                      123/492
5,384,707 A * 1/1995 Kerns ...................... F02D 41/18
                                                      123/479
(Continued)

FOREIGN PATENT DOCUMENTS

CN    1386166 A    12/2002
CN    1472522 A    2/2004
(Continued)

OTHER PUBLICATIONS

International Search Report, PCT International Application No. PCT/EP2010/067477, dated Feb. 16, 2011.

*Primary Examiner* — Mahmoud Gimie
*Assistant Examiner* — Sizo Vilakazi
(74) *Attorney, Agent, or Firm* — Kenyon & Kenyon LLP

(57) ABSTRACT

A method for operating an internal combustion engine. The internal combustion engine has at least one cylinder, to which are connected an intake manifold having an air mass sensor, an exhaust pipe having a λ-sensor and an exhaust gas recirculation line having an exhaust gas recirculation valve. The air mass sensor generates an air mass sensor signal. The λ-sensor generates a λ-sensor signal. The exhaust gas recirculation valve is adjusted by a control signal. A setpoint injection quantity is formed and the control signal of the exhaust gas recirculation valve is formed as a function of the air mass sensor signal. An air mass replacement signal for the air mass sensor signal is formed as a function of the λ-sensor signal and the setpoint injection quantity. In the case of a faulty air mass sensor signal, the control signal is formed as a function of the air mass replacement signal.

7 Claims, 3 Drawing Sheets

(51) Int. Cl.
*G06F 7/00* (2006.01)
*G06F 17/00* (2006.01)
*F02D 41/00* (2006.01)
*F02D 41/18* (2006.01)
*F02D 41/22* (2006.01)

(56) References Cited

U.S. PATENT DOCUMENTS

| | | | |
|---|---|---|---|
| 6,508,111 B2 * | 1/2003 | Osaki | F02D 21/08 |
| | | | 73/114.32 |
| 6,655,200 B2 * | 12/2003 | Osaki | F02D 21/08 |
| | | | 73/114.25 |
| 6,688,164 B2 | 2/2004 | Landschoff | |
| 6,842,690 B2 | 1/2005 | Akao et al. | |
| 6,928,854 B2 * | 8/2005 | Hartz | F02D 41/187 |
| | | | 73/1.16 |
| 7,066,144 B2 | 6/2006 | Harunari et al. | |
| 7,267,117 B2 | 9/2007 | Tonetti et al. | |
| 2004/0045541 A1 * | 3/2004 | Akao | F02D 41/0065 |
| | | | 123/690 |
| 2005/0274369 A1 * | 12/2005 | Tonetti | F02D 41/0072 |
| | | | 123/704 |

FOREIGN PATENT DOCUMENTS

| | | |
|---|---|---|
| CN | 1580532 A | 2/2005 |
| DE | 10330106 | 4/2004 |
| DE | 602004012986 | 6/2009 |
| FR | 2917459 | 12/2008 |
| WO | WO 01/46579 | 6/2001 |

\* cited by examiner

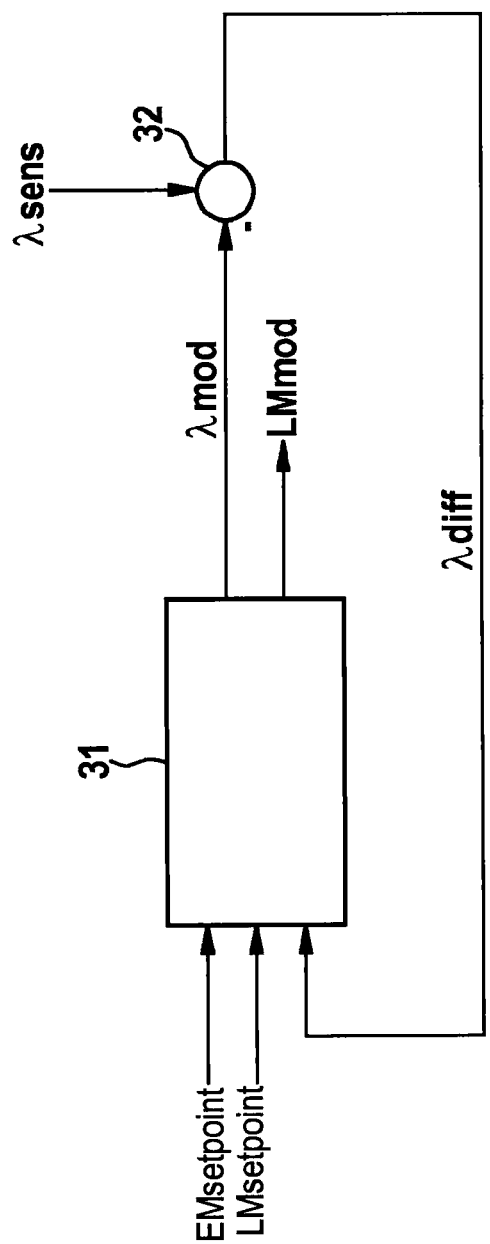

METHOD FOR OPERATING AN INTERNAL COMBUSTION ENGINE

FIELD OF THE INVENTION

The present invention relates to a method for operating an internal combustion engine.

BACKGROUND INFORMATION

A portion of the exhaust gases produced by the combustion in the combustion chamber of an internal combustion engine is fed back to the subsequent combustion processes. This is carried out via an exhaust gas recirculation line and an exhaust gas recirculation valve adjustable via a control signal. The purpose of this device and of the method is to achieve the lowest possible emission values and minimize engine noise.

For implementing this method, an air mass sensor signal of an air mass sensor may be used.

In the case of a failure of the air mass sensor, an air mass replacement signal may be formed to mimic its behavior. In this approach, however, the exhaust gas recirculation valve must be closed. For example, this air mass replacement signal must be formed according to the so-called pTn process, which takes into account pressure, temperature and the speed of the internal combustion engine.

Furthermore, in the case of failures, which, for example, no longer allow a pTn process, it is possible to switch over to a so-called 'limp-home' method. In this connection, for the purpose of protecting the engine, the power of the internal combustion engine is greatly reduced with the exhaust gas recirculation valve also being closed.

SUMMARY

In accordance with the present invention, if the air mass sensor has a defect and the air mass sensor signal is thus no longer usable, an air mass replacement signal is formed which makes it possible to continue to control or regulate the control signal of the exhaust gas recirculation valve. Thus, it is not necessary to close the exhaust gas recirculation valve. This makes it possible to achieve low emission values of the exhaust gas even if the air mass sensor is defective.

In one advantageous specific embodiment, the air mass replacement signal is formed with the aid of a λ-sensor signal of a λ-sensor.

The recirculation of exhaust gases in the case of a faulty air mass sensor signal entails that the emission values may continue to be kept at a low level, and disturbing engine noise, as in the case of a closed exhaust gas recirculation valve, may be avoided. Furthermore, the 'limp home' operation may be dispensed with if the λ-sensor signal of the λ-sensor is available.

Additional features, possible applications and advantages of the present invention ensue from the following description of exemplary embodiments of the present invention which are depicted in the figures of the drawings. All described or depicted features constitute the object of the present invention singly or in any combination, irrespective of their wording or depiction in the description or in the figures.

BRIEF DESCRIPTION OF THE DRAWINGS

FIG. 3 shows a schematic representation of an observer system for the control unit of FIG. 2.

DETAILED DESCRIPTION OF EXAMPLE EMBODIMENTS

Figure 1:
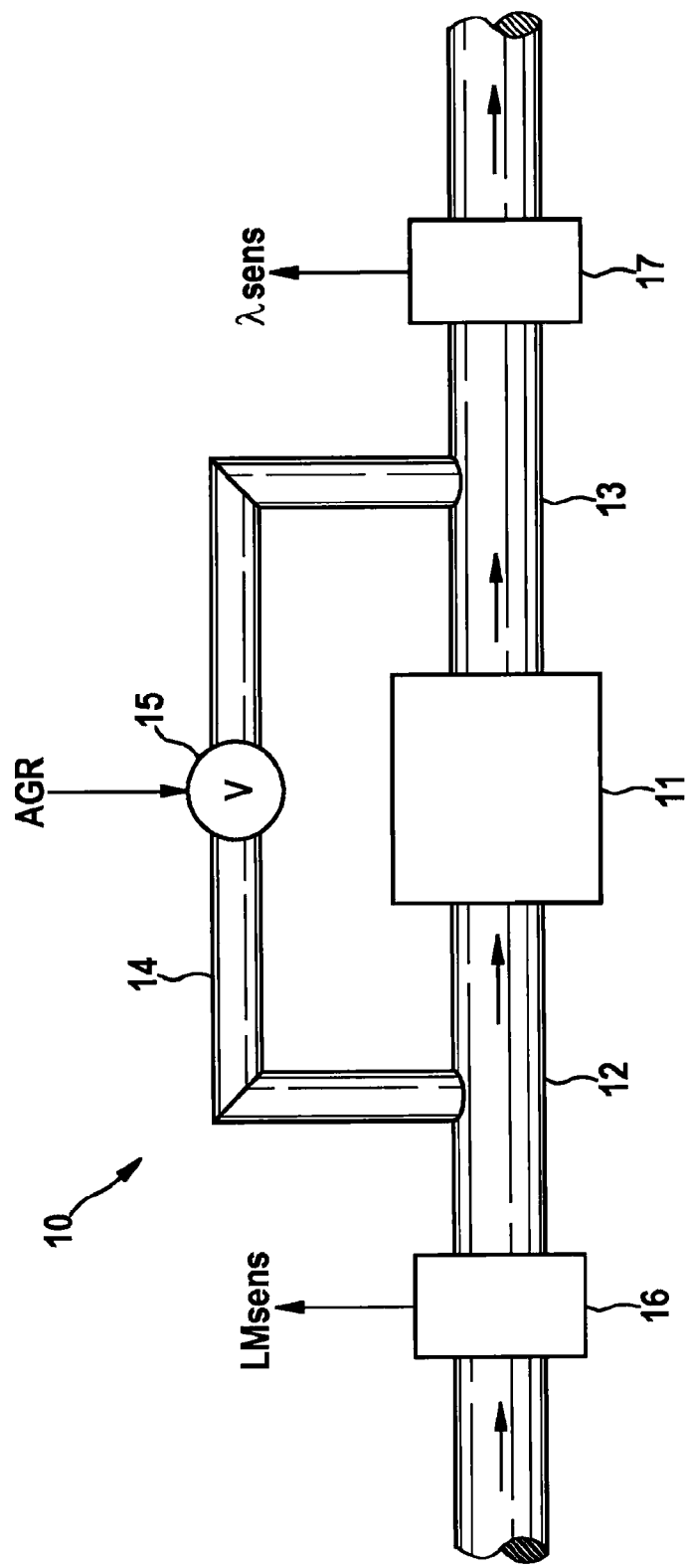
FIG. 1 shows schematically an internal combustion engine.

FIG. 1 schematically shows an internal combustion engine 10 having a cylinder 11 which has a (not shown) combustion chamber for combustion of fuel. Cylinder 11 is connected to an intake manifold 12 and an exhaust pipe 13. Exhaust pipe 13 is connected to intake manifold 12 via an exhaust gas recirculation line 14 and an exhaust gas recirculation valve 15 which is adjustable by a control signal AGR. Fresh air is supplied to cylinder 11 for combustion via intake manifold 12. The fuel may be supplied to intake manifold 12 or cylinder 11. After the combustion process in cylinder 11, the exhaust gas is discharged via exhaust pipe 13.

Intake manifold 12 is provided with an air mass sensor 16 and an exhaust pipe 13 having a λ-sensor 17. Air mass sensor 16 measures the air mass of the fresh air supplied to intake manifold 12 and generates an air mass sensor signal LMsens as a function of the air mass. λ-sensor 17 measures the oxygen content of the exhaust gas in exhaust pipe 13 and generates a λ-sensor signal λsens as a function of the oxygen content.

Via exhaust gas recirculation line 14, exhaust gas from exhaust pipe 13 is mixed with the intake air. Exhaust gas recirculation valve 15 is adjusted to correspond to the desired amount of exhaust gas to be recirculated using control signal AGR. During normal operation, i.e., with a functioning sensor 16, control signal AGR is formed from air mass sensor signal LMsens and an operating point-dependent air mass setpoint value LMsetpoint. Control signal AGR may be formed independently of λ-sensor signal λsens during normal operation.

Figure 2:
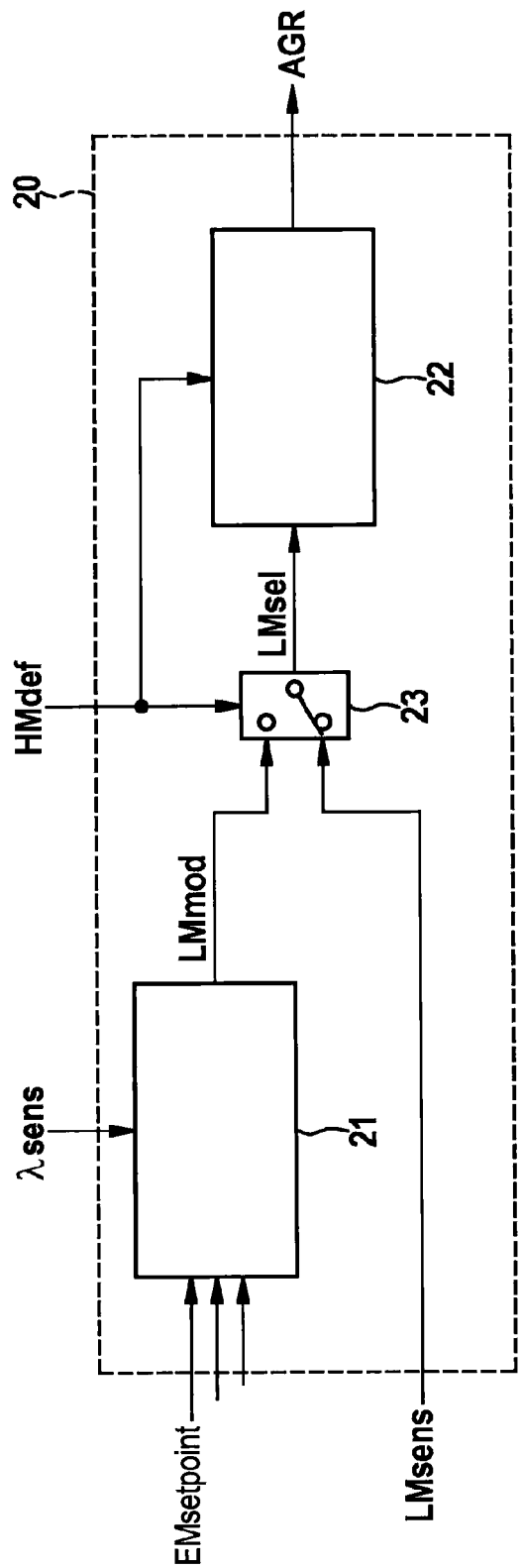
FIG. 2 shows a block diagram of a control unit as well as function blocks for implementing an example method according to the present invention for operating an internal combustion engine.

FIG. 2 shows a control unit 20 and a section of the functionality of control unit 20. This control unit 20 is usually designed as a microcontroller and programmed according to the method described. Furthermore, corresponding computer programs are stored on a storage medium.

Control unit 20 is acted upon by air mass sensor signal LMsens and λ-sensor signal λsens as well as a signal HMdef. Signal HMdef indicates whether air mass sensor 15 is working properly or is defective and accordingly, whether air mass sensor signal LMsens is valid or not. The output signal of control unit 20 is control signal AGR.

Two signal blocks 21 and 22 are present within control unit 20. Signal block 21 is used for generating an air mass replacement signal LMmod, which is a replacement signal for air mass sensor signal LMsens. As will be explained later, signal block 21 is acted upon by signals whose combination allows the formation of air mass replacement signal LMmod. Corresponding to signal HMdef, signal selector switch 23 selects either air mass replacement signal LMmod or air mass sensor signal LMsens as a selected signal LMsel and forwards signal LMsel to signal block 22. Signal block 22 is used for generating control signal AGR at the output of control unit 20. To that end, signals HMdef and LMsel act upon signal block 22. In the case of a defective air mass sensor 16, signal HMdef indicates to signal block 22 that air mass replacement signal LMmod was selected and that signal LMmod is present at signal block 22. For this reason, in contrast to a functioning air mass sensor 16, a modified control or regulation of control signal AGR is performed in signal block 22.

If air mass sensor 16 functions properly, signal selection switch 23 selects air mass sensor signal LMsens for forwarding. If air mass sensor 16 does not function properly, signal selector switch 23 forwards air mass replacement signal LMmod as signal LMsel.

A first method for ascertaining air mass replacement signal LMmod is carried out in signal block 21 according to $$LMmod = \lambda sens * EMsetpoint * Lst\ddot{o}ch.$$

EMsetpoint is in this case a setpoint injection quantity and Lstöch is a stoichiometric factor. Stoichiometric factor Lstöch indicates the ratio in which air and fuel must be mixed to achieve an ideal combustion. An ideal combustion produces an ideal value for λ-sensor signal λsens of 1. Furthermore, stoichiometric factor Lstöch is variable and is determined in diesel fuel, for example, at a value of 14.5. Specifically, setpoint injection quantity EMsetpoint is made available by other functionalities of control unit 20. Signal Block 21 must accordingly be acted upon by signals EMsetpoint and λsens.

FIG. 3 shows a second method for ascertaining air mass replacement signal LMmod. There, an observer system is shown having a signal block 31 which generates at its output a λ-replacement signal λ mod which represents a modeled λ-sensor signal λsens. This λ-replacement signal λ mod is compared with measured λ-sensor signal λsens by subtracting λsens from λ mod at point 32 and an observer difference λdiff is returned to signal block 31. Furthermore, signal block 31 is acted upon by setpoint injection quantity EMsetpoint and air mass setpoint value LMsetpoint. Signals EMsetpoint and LMsetpoint are made available by other functionalities of control unit 20. λ-replacement signal λ mod is obtained using the previous variables in the following equation:

$$\lambda\ mod = LMsetpoint/(EMsetpoint * Lst\ddot{o}ch)$$

Observer difference λdiff is used to influence air mass replacement signal LMmod in such a way that observer difference λdiff is as close as possible to zero.

What is claimed is:

1. A method for operating an internal combustion engine, the internal combustion engine having at least one cylinder, to which are connected an intake manifold having an air mass sensor, an exhaust pipe having a λ-sensor and an exhaust gas recirculation line having an exhaust gas recirculation valve, the air mass sensor being provided for generating an air mass sensor signal, the λ-sensor being provided for generating a λ-sensor signal, and the exhaust gas recirculation valve being controlled using a control signal, the method comprising:
    forming, by a control unit including a processor, a setpoint injection quantity;
    forming, by the control unit, a signal indicating whether the air mass sensor operates properly or is defective;
    forming, by the control unit, an air mass replacement signal for the air mass sensor signal as a function of the λ-sensor signal and the setpoint injection quantity;
    if the air mass sensor operates properly, forming by the control unit the control signal for controlling the exhaust gas recirculation valve as a function of the air mass sensor signal generated by the air mass sensor;
    if the air mass sensor is defective, forming the control signal as a function of the air mass replacement signal; and
    controlling the exhaust gas recirculation valve using the control signal.

2. The method as recited in claim 1, wherein the air mass replacement signal is formed as a function of a comparison of a λ-replacement signal with the λ-sensor signal.

3. The method as recited in claim 2, wherein the λ-replacement signal for the λ-sensor signal is formed according to:

$$\lambda\ mod = LMsetpoint/(EMsetpoint * Lst\ddot{o}ch)$$

λ mod being the λ-replacement signal, LMsetpoint a setpoint air mass, EMsetpoint a setpoint injection quantity and Lstöch a stoichiometric factor.

4. The method as recited in claim 1, wherein the air mass replacement signal for the air mass sensor signal is formed according to: the air mass replacement signal is the product of the λ-sensor signal of the λ-sensor, of a setpoint injection quantity and of a stoichiometric factor.

5. The method as recited in claim 1, wherein control of the control signal is modified for the exhaust gas recirculation valve in the case of an improperly operating air mass sensor.

6. A control unit for an internal combustion engine for a motor vehicle for operating an internal combustion engine, the internal combustion engine having at least one cylinder, to which are connected an intake manifold having an air mass sensor, an exhaust pipe having a λ-sensor and an exhaust gas recirculation line having an exhaust gas recirculation valve, the air mass sensor being provided for generating an air mass sensor signal, the λ-sensor being provided for generating a-sensor signal, and the exhaust gas recirculation valve being controlled using a control signal, the control unit including:
    a microprocessor configured to:
        form a setpoint injection quantity;
        form a signal indicating whether the air mass sensor operates properly or is defective;
        form an air mass replacement signal for the air mass sensor signal as a function of the λ-sensor signal and the setpoint injection quantity;
        if the air mass sensor is defective, form the control signal as a function of the air mass replacement signal; and
        control the exhaust gas recirculation valve using the control signal.

7. A non-transitory, computer-readable data storage medium storing a computer program for a control unit for operating an internal combustion engine, the internal combustion engine having at least one cylinder, to which are connected an intake manifold having an air mass sensor, an exhaust pipe having a λ-sensor and an exhaust gas recirculation line having an exhaust gas recirculation valve, the air mass sensor being provided for generating an air mass sensor signal, the λ-sensor being provided for generating a λ-sensor signal, and the exhaust gas recirculation valve being controlled using a control signal, the computer program, when executed by the control unit, causing the control unit to perform the steps of:
    forming a setpoint injection quantity;
    forming a signal indicating whether the air mass sensor operates properly or is defective;
    forming an air mass replacement signal for the air mass sensor signal as a function of the λ-sensor signal and the setpoint injection quantity;
    if the air mass sensor operates properly, forming the control signal for controlling the exhaust gas recirculation valve as a function of the air mass sensor signal generated by the air mass sensor;
    if the air mass sensor is defective, forming the control signal as a function of the air mass replacement signal; and
    controlling the exhaust gas recirculation valve using the control signal.

* * * * *